United States Patent
Javidi et al.

(10) Patent No.: US 11,461,592 B2
(45) Date of Patent: Oct. 4, 2022

(54) METHODS AND SYSTEMS FOR OBJECT RECOGNITION IN LOW ILLUMINATION CONDITIONS

(71) Applicant: University of Connecticut, Farmington, CT (US)

(72) Inventors: Bahram Javidi, Mansfield, CT (US); Adam Markman, Orange, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 17/251,327

(22) PCT Filed: Aug. 7, 2019

(86) PCT No.: PCT/US2019/045477
§ 371 (c)(1),
(2) Date: Dec. 11, 2020

(87) PCT Pub. No.: WO2020/036782
PCT Pub. Date: Feb. 20, 2020

(65) Prior Publication Data
US 2021/0256314 A1    Aug. 19, 2021

Related U.S. Application Data

(60) Provisional application No. 62/717,037, filed on Aug. 10, 2018.

(51) Int. Cl.
*G06K 9/62* (2022.01)
*G06V 10/143* (2022.01)
(Continued)

(52) U.S. Cl.
CPC ......... *G06K 9/6257* (2013.01); *G06V 10/143* (2022.01); *G06V 10/25* (2022.01); *G06V 20/647* (2022.01)

(58) Field of Classification Search
CPC ............. G06K 9/6257; G06K 9/00208; G06K 9/2018; G06K 9/3233
See application file for complete search history.

(56) References Cited

U.S. PATENT DOCUMENTS 4,555,179 A   11/1985 Langerholc et al.
5,299,035 A    3/1994 Leith et al.
(Continued)

FOREIGN PATENT DOCUMENTS

CN    101894276 A    11/2010
CN    101894276 B     9/2012
(Continued)

OTHER PUBLICATIONS

Adrian Stern, Doron Aloni, and Bahram Javidi, Experiments With Three-Dimensional Integral Imaging Under Low light Levels, IEEE Photonics Journal, vol. 4, No. 4, p. 1188-1195, Aug. 2012, DOI: 10.1109/JPHOT.2012.2205912 (Year: 2012).*

(Continued)

*Primary Examiner* — Bernard Krasnic
(74) *Attorney, Agent, or Firm* — Michael Best & Friedrich LLP

(57) ABSTRACT

Described herein is an object recognition system in low illumination conditions. A 3D InIm system can be trained in the low illumination levels to classify 3D objects obtained under low illumination conditions. Regions of interest obtained from 3D reconstructed images are obtained by de-noising the 3D reconstructed image using total-variation regularization using an augmented Lagrange approach followed by face detection. The regions of interest are then inputted into a trained CNN. The CNN can be trained using 3D InIm reconstructed under low illumination after TV-denoising. The elemental images were obtained under various low illumination conditions having different SNRs. The (Continued)

CNN can effectively recognize the 3D reconstructed faces after TV-denoising.

19 Claims, 9 Drawing Sheets

(51) Int. Cl.
  *G06V 10/25* (2022.01)
  *G06V 20/64* (2022.01)

(56) References Cited

U.S. PATENT DOCUMENTS

| | | | |
|---|---|---|---|
| 5,371,368 A | 12/1994 | Alfano et al. | |
| 6,072,494 A | 6/2000 | Nguyen | |
| 6,128,003 A | 10/2000 | Smith et al. | |
| 6,215,587 B1 | 4/2001 | Alfano et al. | |
| 7,009,700 B2 | 3/2006 | Dubois et al. | |
| 7,242,449 B1 | 7/2007 | Yamazaki et al. | |
| 8,044,999 B2 | 10/2011 | Mullen et al. | |
| 8,836,793 B1 | 9/2014 | Kriesel et al. | |
| 9,185,391 B1 | 11/2015 | Prechtl | |
| 10,419,688 B2* | 9/2019 | Gurgov | H04N 13/204 |
| 2002/0179717 A1 | 12/2002 | Cummings et al. | |
| 2003/0182013 A1 | 9/2003 | Moreas et al. | |
| 2005/0126505 A1 | 6/2005 | Gallager et al. | |
| 2006/0114553 A1 | 6/2006 | Laudo | |
| 2007/0083535 A1 | 4/2007 | Zilliacus et al. | |
| 2007/0171432 A1 | 7/2007 | Neuhauser et al. | |
| 2008/0018966 A1 | 1/2008 | Dubois et al. | |
| 2008/0170218 A1 | 7/2008 | Dantus et al. | |
| 2008/0317200 A1 | 12/2008 | Lecomte et al. | |
| 2009/0160985 A1* | 6/2009 | Javidi | G06K 9/00214 348/294 |
| 2010/0060897 A1 | 3/2010 | Gustafsson | |
| 2011/0053693 A1 | 3/2011 | Wright | |
| 2011/0222745 A1 | 9/2011 | Osterhout et al. | |
| 2012/0194649 A1 | 8/2012 | Javidi et al. | |
| 2013/0015236 A1 | 1/2013 | Porter et al. | |
| 2013/0088568 A1 | 4/2013 | Nolte | |
| 2013/0221084 A1 | 8/2013 | Doss et al. | |
| 2014/0133702 A1 | 5/2014 | Zheng et al. | |
| 2014/0317713 A1 | 10/2014 | Gadotti | |
| 2015/0049343 A1 | 2/2015 | Shaked et al. | |
| 2015/0192769 A1 | 7/2015 | Dresel et al. | |
| 2015/0269427 A1 | 9/2015 | Kim et al. | |
| 2015/0295711 A1 | 10/2015 | Javidi et al. | |
| 2015/0304638 A1 | 10/2015 | Cho et al. | |
| 2015/0347889 A1 | 12/2015 | Nosaka et al. | |
| 2015/0356306 A1 | 12/2015 | Carter | |
| 2016/0153766 A1 | 6/2016 | Jones et al. | |
| 2016/0305883 A1 | 10/2016 | Betzig et al. | |
| 2016/0360186 A1* | 12/2016 | Javidi | G06K 9/4676 |
| 2017/0023472 A1 | 1/2017 | Pavilion et al. | |
| 2017/0227754 A1 | 8/2017 | Huang | |
| 2017/0270388 A1 | 9/2017 | Vercruysse | |
| 2017/0322410 A1 | 11/2017 | Watson et al. | |
| 2017/0342500 A1 | 11/2017 | Marquard et al. | |
| 2018/0000441 A1* | 1/2018 | Wang | A61B 6/504 |
| 2018/0024341 A1 | 1/2018 | Romanowski et al. | |
| 2018/0146180 A1 | 5/2018 | Keesling et al. | |
| 2019/0138786 A1* | 5/2019 | Trenholm | G06T 7/50 |
| 2019/0180143 A1* | 6/2019 | Lyu | G06T 1/20 |
| 2019/0226972 A1 | 7/2019 | Javidi et al. | |
| 2021/0278398 A1 | 9/2021 | Luo et al. | |

FOREIGN PATENT DOCUMENTS

| | | | |
|---|---|---|---|
| CN | 108985344 A | * | 12/2018 |
| DE | 102005036326 A1 | | 2/2007 |
| WO | 2014190303 A1 | | 11/2014 |
| WO | WO2020036782 A2 | | 2/2020 |

OTHER PUBLICATIONS

Stanley Chan, Ramsin Khoshabeh, Kristofor Gibson, Philip Gill, and Truong Nguyen, An Augmented Lagrangian Method for Total Variation Video Restoration, IEEE transactions on image processing : a publication of the IEEE Signal Processing Society, vol. 20, No. 11, 2011, DOI: 10.1109/TIP.2011.2158229 (Year: 2011).*

Xia Zhao, Haihang Jia, Yingting Ni, A novel three-dimensional object detection with the modified You Only Look Once method, International Journal of Advanced Robotic Systems. Mar. 2018. doi:10.1177/1729881418765507 (Year: 2018).*

Akram et al. , "Camera Based Visible Light Communication System for Underwater Applications", Published in IEEE International Conference on Industrial and Information Systems, ICIIS 2017, 6 Pages.

Amer et al., "Enhancing underwater optical imaging by using a low-pass polarization filter", Optic Express vol. 27 No. 2 Jan. 21, 2019, 23 Pages.

Bonin et al., "Imaging Systems for Advanced Underwater Vehicles", Journal of Maritime Research, vol. VIII. No. 1, 2011, pp. 65-86.

Burguera et al., "Trajectory-Based Visual Localization in Underwater Surveying Missions", Sensors, 15, 2015, pp. 1708-1735.

Cho et al., "Peplography—a passive 30 photon counting imaging through scattering media" Optics Letters vol. 41 No. 22, Nov. 15, 2016 pp. 5401-5404.

Cho et al., "Three-Dimensional Visualization of Objects in Turbid Water Using Integral Imaging", Journal of Display Technology, vol. 6, No. 10, Oct. 2010, pp. 544-547.

Doster et al., "Laguerre-Gauss and Bessel-Gauss beams propagation through turbulence: analysis of channel efficiency", applied optics vol. 55 No. 36, Dec. 20, 2016 pp. 10239-10246.

Dubreuil et al., "Exploring underwater target detection by imaging polarimetry and correlation techniques", Applied Optics vol. 52 No. 5, 2013, pp. 997-1005.

Goodman, "Statistical Optics", Book Published in 2000, 16 pages.

Goudail et al., "Bhattacharyya distance as a contrast parameter for statistical processing of noisy optical images", Optical Society of America, © 2004, pp. 1231-1240.

Hamamatsu, "Photon Is Our Business", Book © 2007, 14 Pages.

Javidi et al., "Multidimensional Optical Sensing and Imaging System (MOSIS): From Macroscales to Microscales", Proceedings Op the IEEE, vol. 105 No. 5 May 5, 2017, pp. 850-875.

Kakue et al., "High-speed phase imaging by parallel phase-shifting digital holography", Optics Letters vol. 36 No. 21, pp. 4131-4133.

Kaushal et al., "Underwater Optical Wireless Communication", IEE Access Apr. 11, 2016, pp. 1518-1547.

Khalighi et al., "Underwater Wireless Optical Communications Using Silicon Photo-Multipliers", IEEE Photonics Journal, Jul. 14, 2017, 11 Pgs.

Kullback et al., "On Information and Sufficiency", The Annal of Mathematatical. Statistics vol. 22 No. 1, 1951, pp. 79-86.

Lathi et al., "Modern Digital and Analog Communication Systems", Book Oxford University Press 2010, 15 Pgs.

Lin et al., "Radiative transfer simulations of the two-dimensional ocean glint reflectance and determination of the sea surface roughness", Applied Optics vol. 55 No. 6 Feb. 20, 2016, pp. 1206-1215.

Lippman, "Epreuves reversibles donnant la sensation du relief", Journal of Theoretical and Applied Physics, vol. 7 No. 1, 1908, pp. 821-825.

Liu et al., "An underwater acoustic direct sequence spread spectrum communication system using dual spread spectrum code", Frontiers of Information Technology & Electronic Engineering vol. 19 No. 8, 2018, pp. 972-983.

Lopez-Salcedo, "Simple Closed-Form Approximation to Ricean Sum Distributions", IEEE Signal Processing Letters, Apr. 2009, 4 Pgs.

Matoba et al., "Multimodal Imaging Based on Digital Holography", Proceedings of the IEEE vol. 105, No. 5, May 2017, pp. 906-923.

(56) References Cited

OTHER PUBLICATIONS

Mollah et al., "Comparative Analysis of Gold Codes with PN Codes Using Correlation Property in CDMA Technology" International Conference on Computer Communication and Informatics Jan. 10-12, 2012, 6 Pgs.
Oiknin et al., "Compressive sensing resonator spectroscopy", Optics Letters vol. 42, No. 1, Jan. 1, 2017, pp. 25-28.
Okoshi, "Three-Dimensional Displays", Proceedings of the IEEE, vol. 68, No. 5, 1980, pp. 548-564.
Palmese et al., "Spread Spectrum Modulation for Acoustic Communication in Shallow Water Channel", University of Connecticut, Paper No. 061215-038, IEEE © 2007, 4 Pgs.
Peng et al., "Generalization of the Dark Channel Prior for Single Image Restoration", IEEE Transactions on Image Processing, vol. 27. No. 6. Jun. 2018, 2856-2868.
Peng et al., "Underwater Image Restoration Based on Image Blurriness and Light Absorption", IEEE Transactions on Image Processing, vol. 26, No. 4, Apr. 2017, pp. 1579-1594.
Photron, FASTCAM, SA-X2 Datasheets, 2012, 6 pgs.
Proakis, Digital Communication Fourth Edition Book, McGraw-Hill 2000, 12 Pgs.
Proakis, et al. Digital Communication Fifth Edition Book, McGraw-Hill Higher Education, 2008, 15 Pgs.
Refregier et al., "Nonlinear joint-transform correlation: an optimal solution for adaptive image discrimination and input noise robustness", Optics Letters, vol. 19, No. 6, Mar. 15, 1994, pp. 405-407.
Sadjadi et al., "Automatic Target Recognition XXVII", Proceedings of SPIE vol. 10202, Apr. 10-11, 2017, 9 Pgs.
Song et al., "ROC operating point selection for classification of imbalanced data with application to computer-aided polyp detection in CT colonography", Int J CARS, 2014, pp. 79-89.
Takai et al., "Optical Vehicle-to-Vehicle Communication System Using LED Transmitter and Camera Receiver", IEEE Photonics Journal vol. 6 No. 5 Oct. 2014, 14 Pgs.
Treibitz et al., "Active Polarization Descattering", IEEE Trans. PAMI, vol. 31, No. 3, 2009, pp. 385-399.
Wu et al., Blue Laser Diode Enables Underwater Communication at 12.4Gbps, Scientific Reports, Published: Jan. 17, 2017, 10 Pgs.
Xia et al., "One million fps digital holography", Electronics Letters vol. 50 No. 23, Nov. 6, 2014, pp. 1693-1695.
Xiao et al., "Advances in three-dimensional integral imaging: sensing, display, and applications [Invited]", Applied Optics Vo. 52 No. 4, Feb. 1, 2013 pp. 546-560.
Zweig et al., "Receiver-Operating Characteristic (AOC) Plots: A Fundamental Evaluation Tool in Clinical Medicine", Clinical Chemistry Vo. 39 No. 4, 1993, pp. 561-577.
Alfalou, A. et al., Optical image compression and encryption methods, Adv. Opt. Photon. 1, pp. 589-636 (2009).
Ando, et al., "Speckle-Learning-Based Object Recognition Through Scattering Media," Opt. Express 23, 33902-3391 (2015) (9 Pages).
Barrera, J. et al., Optical encryption and QR codes: Secure and noise-free information retrieval, Opt. Express 21(5):5373-5378 (2013).
Boening, T. W. Groemer, and J. Klingauf, "Applicability of an EM-CCD for spatially resolved TIR-ICS," Opt. Express 18(13), 13516-13528 (2010).
Carnicer, A. et al., Vulnerability to chosen-cyphertext attacks of optical encryption schemes based on double random phase keys, Opt. Lett. 30, DD. 1644-1646 (2005).
Chan, R. Khoshabeh, K. B. Gibson, P. E. Gill, and T. Q. Nguyen, "An augmented Lagrangian method for total variation video restoration," IEEE Trans. Image Process. 20(11), 3097-3111 (2011).
Chen, H. Wei, and J. Ferryman, "A Survey of Human Motion Analysis Using Depth Imagery" Pattern Recognition Letters, 34, 1995-2006 (2013).
Chen, W. et al., Phase-modulated optical system with sparse representation for information encoding and authentication, IEEE Photon. J. 5, 6900113 (2013).
Chen, Wen, Bahram Javidi, and Xudong Chen. "Advances in optical security systems." Advances in Optics and Photonics 6.2 (2014): 1-37.

Cho et al. "Three-Dimensional Optical Sensing and Visualization Using Integral Imaging," in Proceedings of the IEEE, vol. 99, No. 4, pp. 556-575, Apr. 2011. doi: 10.1109/JPROC.2010.2090114 (Year: 2011).
Cho et al., "Three-dimensional tracking of occluded objects using integral imaging," Opt. Lett. 33, 2737-2739 (2008).
Cho et al.,3D passive Integral Imaging Using Compressive Sensing, Nov. 2012, Optical Society of America, vol. 20. No. 24, pp. 26624-26635.
Cho, Myungjin, and Bahram Javidi. "Three-dimensional photon counting double-random-phase encryption." Optics letters 38.17 (2013): 3198-3201.
Dainty, J. C., "The Statistics of Speckle Patterns," Progress in Optics XIV, North-Holland (1976).
Dubois, F., Automatic spatial frequency selection algorithm for pattern recognition by correlation, Appl. Opt. 32, 4365-4371 (1993).
Frauel, Y. et al., Resistance of the double random phase encryption against various attacks, Opt. Express 15, pp. 10253-10265 (2007).
Goudail, F. et al., Influence of a perturbation in a double phase-encoding system, J. Opt. Soc. Am. A 15, pp. 2629-2638 (1998).
Han, L. Shao, D. Xu, J. Shotton, "Enhanced Computer Vision with Microsoft Kinect Sensor: A Review", IEEE Trans. On Cybernetics, 43, 5, 1318-1334 (2013).
Hoshino, F. Okano, H. Isono, and I. Yuyama, "Analysis of resolution limitation of integral photography," J. Opt. Soc. Am. A 15(8), 2059-2065 (1998).
Huffman, David A., A Method for the Construction of Minimum-Redundancy Codes, Proceedings of the IRE (IEEE, 1952), Sep. 1952, pp. 1098-1101.
International Preliminary Report on Patentability for Application No. PCT/US2019/045477 dated Feb. 25, 2021 (7 pages).
International Search Report and Written Opinion for Application No. PCT/US2019/045477 dated Mar. 5, 2020 (13 pages).
Jang and B. Javidi, "Three-dimensional synthetic aperture integral imaging," Opt. Lett. 27(13), 1144-1146 (2002).
Javidi et al., "Sickle cell disease diagnosis based on spatio-temporal cell dynamics analysis using 3D printed shearing digital holographic microscopy", Optics Express, vol. 26, No. 10, May 2018, 14 pages.
Javidi, B., Nonlinear joint power spectrum based optical correlation, ADDI. Opt. 28, DD. 2358-2367 (1989).
Krizhevsky, I. Sutskever, and G. Hinton, "Imagenet classification with deep convolutional neural networks," in the Neural Information Processing Systems Conference (2012), pp. 1097-1105.
Lawrence, C. L. Giles, A. C. Tsoi, and A. D. Back, "Face recognition: a convolutional neural-network approach," IEEE Trans. Neural Netw. 8(1), 98-113 (1997).
Leith et al. "Imaging Through Scattering Media With Holography," J. Opt. Soc. Am. A9, 1148-1153 (1992) (6 Pages).
LeMaster et al., "Mid-Wave Infrared 3D Integral Imaging at Long Range" J. Display Technology 9(7): 545-551 (2013) [7 pages].
Levin and Q. Zhang, "A global analysis of factors controlling VIIRS nighttime light levels from densely populated areas," Remote Sens. Rev. 190, 366-382 (2017).
Li, Y. et al., Security and encryption optical systems based on a correlator with significant output images, Appl. Opt. 39, pp. 5295-5301 (2000).
Llavador, E. Sánchez-Ortiga, G. Saavedra, B. Javidi, and M. Martínez-Corral, "Free-depths reconstruction with synthetic impulse response in integral imaging," Opt. Express 23(23), 30127-30135 (2015).
Markman et al. "Learning in the dark: 3D integral imaging object recognition in very low illumination conditions using convolutional neural networks" OSA Continuum, 1(2):3068-3071 (2018).
Markman, A., Bahram Javidi, and Mohammad Tehranipoor. "Photon-counting security tagging and verification using optically encoded QR codes." Photonics Journal, IEEE 6.1 (2014): 6800609.
Markman, Adam, and Bahram Javidi. "Full-phase photon-counting double-random-phase encryption." JOSA A 31.2 (2014): 394-403.
Matoba et al., Encrypted optical memory systems based on multidimensional keys for secure data storage and communications, IEEE Gire. Dev. Maa. 16, DD. 8-15 (2000).
Matoba, 0. et al., Optical techniques for information security, Proc. IEEE 97, pp. 1128-1148 (2009).

(56) References Cited

OTHER PUBLICATIONS

Mogensen et al., Phase-Only Optical Encryption, Apr. 2000, Optical Society Of America, vol. 25 No. 8, pp. 566-568.

Moon et al., "Identification of Malaria-Infected Red Blood Cells Via Digital Shearing Interferometry and Statistical Inference", IEEE Photonics Journal, vol. 5, No. 5, Oct. 2013, 8 pages.

O'Connor et al., "Automatic cell identification and visualization using digital holographic microscopy with head mounted augmented reality devices", Applied Optics, vol. 57, No. 7, Mar. 2018, pp. B197-B204.

Ohbuchi, E. et al., Barcode readers using the camera device in mobile phones, in Proceedings of IEEE 2004 International Conference on Cyberworlds, M. Nakajima, ed. (IEEE, 2004), DD. 260-265.

Okano, H. Hoshino, J. Arai, and I. Yuyama, "Real-time pickup method for a three-dimensional image based on integral photography," Appl. Opt. 36(7), 1598-1603 (1997).

Perez-Cabre, E. et al., Information authentication using photon-counting double-random-phase encrypted images, Opt. Lett. 36, pp. 22-24 (2011).

Perez-Cabre, Elisabet et al., Photon-counting double-random-phase encoding for secure image verification and retrieval, Aug. 2012, Polytechnic University of Catalonica, Journal of Optics 14.

Petrášek and K. Suhling, "Photon arrival timing with sub-camera exposure time resolution in wide-field time-resolved photon counting imaging," Opt. Express 18(24), 24888-24901 (2010).

Phillips, D. Gruber, G. Vasan, C. Roman, V. Pieribone, and J. Sparks, "Observations of in situ deep-sea marine bioluminescence with a high-speed, high-resolution sCMOS camera," Deep Sea Res. Part I Oceanogr. Res. Pap. 111, 102-109 (2016).

Rawat et al., "Compact and field-portable 3D printed shearing digital holographic microscope for automated cell identification", Applied Optics, vol. 56, No. 9, Mar. 2017, pp. D127-D133.

Refregier, P. et al., Optical image encryption based on input plane and Fourier plane random encoding, Opt. Lett. 20, DD. 767-769 (1995).

Sadjadi and A. Mahalanobis, "Automatic target recognition XXVIII," Proc. SPIE 10648, 106480I (2018).

Shan et al, Application of QR Two-dimension Code Technology in Credits Certification System, Dec. 2013, ACM ICCC '13: Proceedings of the Second International Conference on Innovative Computing and Cloud Computing, pp. 222-224.

Stern, D. Aloni, and B. Javidi, "Experiments with three-dimensional integral imaging under low light levels," IEEE Photon. J. 4(4), 1188-1195 (2012).

Suzuki, H. et al., Experimental evaluation of fingerprint verification system based on double random phase encoding, Opt. Express 14, pp. 1755-1766 (2006).

Tajahuerce, Enrique, and Bahram Javidi. "Encrypting three-dimensional information with digital holography." Applied Optics 39.35 (2000): 6595-6601.

Tanzid et al. "Absorption-Induced Image Resolution Enhancement in Scattering Media," ACS Photonics. 3:1787-1793 (2016) (7 Pages).

Tavakoli, B. Javidi, and E. Watson, "Three dimensional visualization by photon counting computational Integral Imaging," Opt. Express 16(7), 4426-4436 (2008).

Thompson et al., "Imaging in Scattering Media by Use of Laser Speckle," J. Opt. Soc. Am. A 14, 2269-2277 (1997) (9 Pages).

Towghi, N. et al., Fully phase encryption image processor, J. Opt. Soc. Am. A 16, 1999, pp. 1915-1927.

Traver et al. Paper entitled "Human Gesture Recognition Using Three Dimensional Integral Imaging" J. Opt. Soc Am. A 31(10):2312-2320 (2014). [9 pages].

Viola, M. Jones, and D. Snow, "Detecting pedestrians using patterns of motion and appearance," Int. J. Comput. Vis. 63(2), 153-161 (2005).

Wu et al. "Hiding Scattering Layers For Noninvasive Imaging Of Hidden Objects," Scientific Reports vol. 5, 8375 (2015) (5 Pages).

Yamaguchi and R. Higashida, "3D touchable holographic light-field display," Appl. Opt. 55(3), A178-A183 (2016).

Yoo, et al., "Imaging Through A Scattering Wall Using Absorption," Opt. Lett. 16, 1068-1070 (1991) (3 Pages).

Markman et al. "Three-dimensional object visualization and detection in low light illumination using integral imaging" Optic Letters vol. 42, No. 16, Aug. 15, 2017, pp. 3068-3071.

Ma, Lateral Shearing Common-Path Digital Holographic Microscopy, Jun. 12, 2017, Optics Express, vol. 25, pp. 13659-13667 (Year: 2017).

* cited by examiner

METHODS AND SYSTEMS FOR OBJECT RECOGNITION IN LOW ILLUMINATION CONDITIONS

CROSS-REFERENCE TO RELATED APPLICATIONS

This application is a national phase filing under 35 U.S.C. § 371 of International Application No. PCT/US2019/045477, filed Aug. 7, 2019, which claims priority to U.S. Provisional Patent Application No. 62/717,037, filed Aug. 10, 2018, the entire contents of which is incorporated herein by reference.

STATEMENT OF GOVERNMENT INTEREST

This invention was made with government support under grant number W909MY-12-D-0008 awarded by the Department of Defense Army Research Office. The government has certain rights in the invention.

FIELD OF THE DISCLOSURE

The present disclosure contained herein is in the general field of imaging methods and systems for 3D object recognition.

BACKGROUND OF THE DISCLOSURE

Imaging a scene in low illumination conditions using conventional image sensors that operate in the visible spectrum is difficult as the captured images become read-noise dominant Thus, signal-to-noise ratio (SNR) suffers resulting in poor scene visualization in addition to making object recognition a difficult task.

The electron-multiplying CCD cameras (EM-CCD) and scientific CMOS (sCMOS) cameras, used to for imaging in low-light conditions, are expensive and bulky. In particular, the EM-CCD needs to be cooled to around −55° C. prior to operation. Night vision operates by amplifying the number of photons in the scene. Accordingly, if too few photons are available, an active near infrared source is required to illuminate the scene. Infrared cameras have a lower resolution compared with visible range cameras and may require bulkier and more expensive optics.

These and other needs are effectively addressed by the systems and methods of the present disclosure.

SUMMARY OF THE DISCLOSURE

Embodiments of the present disclosure include systems and methods for detecting and classifying 3D objects in a 3D scene in a range of illumination conditions including in low illumination conditions using three-dimensional (3D) integral imaging (InIm) Low illumination conditions are defined as having low light flux in the scene resulting in degraded captured images compromised by detector noise which may be very difficult to visualize and/or recognize. Low cost passive image sensors that operate in visible spectrum can be used to capture elemental images of 3D scene in low illumination conditions. The image sensors may also operate beyond the visible spectrum. The elemental images are read-noise dominant Additionally, 3D InIm is naturally optimal in the maximum likelihood sense for read-noise dominant image as this follows a Gaussian distribution. Upon 3D InIm reconstruction of the 3D scene, signal-to-noise ratio (SNR) increases resulting in improved image visualization. The 3D scene can be de-noised with total-variation regularization using an augmented Lagrange approach (TV-denoising). Regions of interest can be identified and input into a trained convolutional neural network (CNN) for facial/object recognition. The regions/objects may partially occluded from view. The CNN can be pre-trained specifically for object recognition in low-light conditions by training the CNN using 3D reconstructed images from elemental images obtained under low-light conditions. The claimed system can perform object detection and classification in low light levels using the CNN trained in the dark. As an example, an object can include physical objects such as human body parts. In this regard, the claimed system can perform face detection and recognition in low illumination conditions.

In one embodiment, an object recognition system, method, and computer readable medium can detect objects in low illumination using 3D integral imaging. The system can include a computing system including a database and hosting a deep learning engine which implements a deep learning model and an object detection application. The system further includes one or more image capturing devices in communication with the computing system. The one or more image capturing devices are configured to capture plurality of elemental images of a 3D scene including one or more objects and in low illumination levels, and transmit the plurality of elemental images to the computing system. The 3D scene and/or object(s) in the 3D scene may be partially occluded from view. The computing system is configured to receive the plurality of elemental images of the 3D scene, reconstruct the 3D scene using the plurality of elemental images of the 3D scene, and de-noise the reconstructed 3D scene. Of note, the illumination conditions associated with the elemental images received by the computing system are unknown, i.e., illumination conditions are not transmitted to the computing system for use in downstream processing operations by the computing system. The computing system is configured to input the 3D scene in the object detection application to identify one or more regions of interest in the 3D scene. The computing system is further configured to retrieve a set of training data from the database, and train the deep learning engine using the training data on at least one instance. The computing system can input the identified regions of interest in the deep learning engine. The computing system, via the deep learning engine implementing the deep learning model can identify the one or more objects in the one or more regions of interest.

The object detection application can be configured to detect regions of interest including objects. The objects can include physical objects such as human body parts. As an example, the object detection application can detect regions of interest with human faces.

The deep learning model can be a CNN. The training data includes a set of elemental images including elemental images captured in various illumination levels below the threshold amount and having various levels of SNR. The training data further includes augmented (i.e., additional) data obtained by taking an original set of elemental images and perturbing them by adding Gaussian noise, and then translating the perturbed data. The computing system is configured to de-noise the reconstructed 3D scene using total-variation regularization using an augmented Lagrange approach. The computing system is configured to implement a virtual pinhole array. The computing system is configured to reconstruct the 3D image by back-propagating captured light rays from the plurality of elemental images through the virtual pinhole to a specified depth plane at a specified distance. The one or more image capturing devices is one or more of a lenslett array, an array of cameras, and a moving camera. The plurality of elemental images of the 3D scene include elemental images capturing the 3D scene from different perspectives. The one or more objects may include at least one human face. The plurality of elemental images are one or more of a still image and a moving image.

Additional advantageous features, functions and benefits of the present disclosure will be apparent from the description which follows, particularly when read in conjunction with the accompanying figures.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF THE DISCLOSURE

Figure 1:
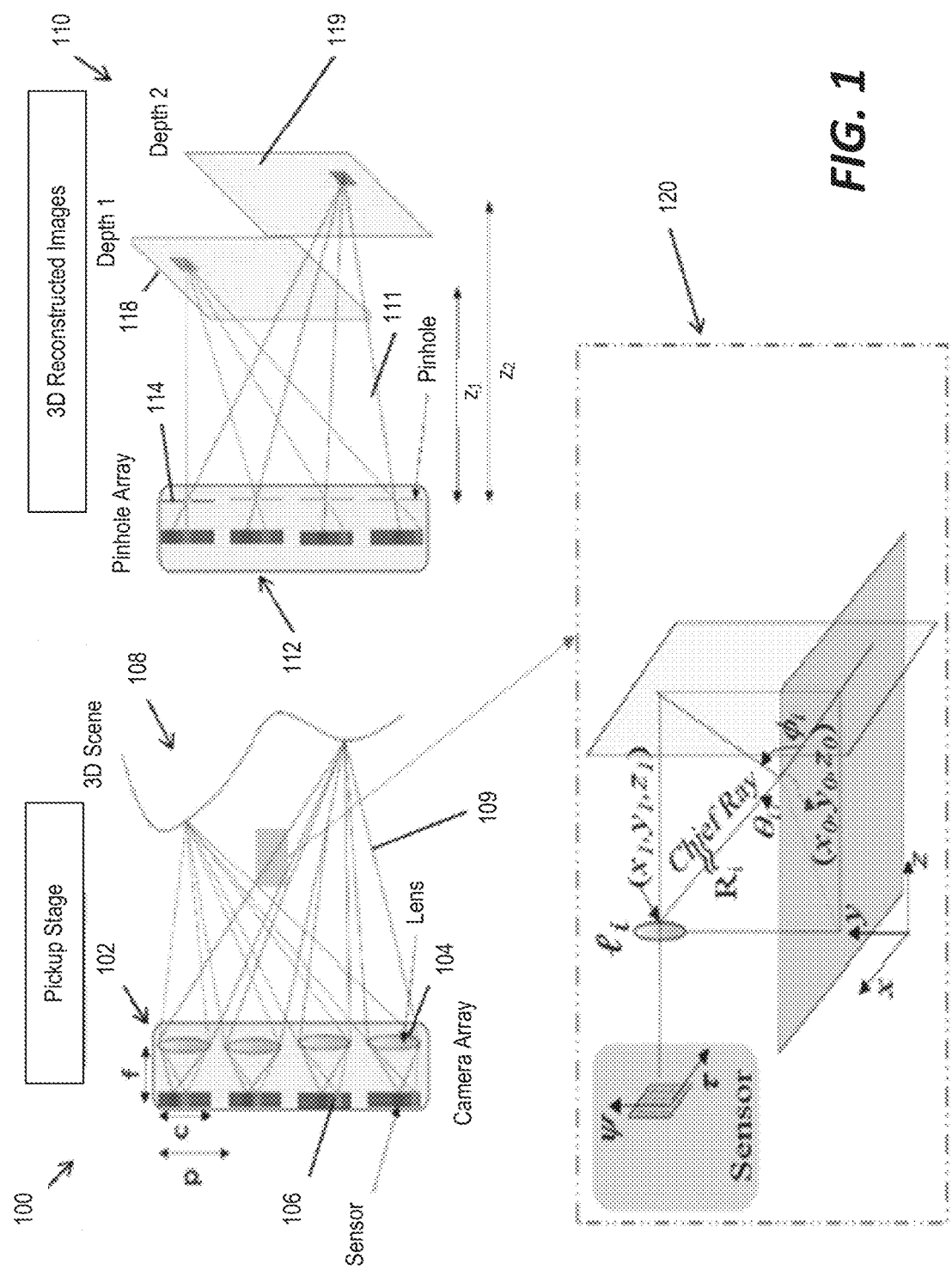
FIG. 1 is a block diagram of the 3D scene capture and reconstruction in accordance with an exemplary embodiment.

The exemplary embodiments disclosed herein are illustrative of methods and related systems. Described herein is an object recognition system that is operable in a range of illumination conditions including in low illumination conditions using 3D integral imaging. Low illumination conditions are defined as having low light flux in the scene resulting in degraded captured images compromised by detector noise which may be very difficult to visualize and/or recognize. The system includes a computing system including a database and hosting a deep learning engine, and an object detection application. The system further includes one or more image capturing devices in communication with the computing system. The one or more image capturing devices are configured to capture a plurality of elemental images of a 3D scene including one or more objects and in an illumination level lower than a threshold amount, and transmit the plurality of elemental images to the computing system. The 3D scene and/or the object(s) in the 3D scene may be partially occluded from view. The computing system is configured to receive the plurality of elemental images of the 3D scene, retrieve a set of training data from the database, train the deep learning engine using the training data on at least one instance, reconstruct the 3D scene using the plurality of or more elemental images of the 3D scene, de-noise the reconstructed 3D scene, input the 3D scene in the object detection application to identify one or more regions of interest in the 3D scene and identify the one or more objects in the 3D scene by inputting the one or more regions of interest of the 3D scene in the deep learning engine.

The object detection application can be configured to detect regions of interest including objects. The objects can include physical objects such as human body parts. As an example, the object detection application can detect regions of interest with human faces. As noted above, the region(s) of interest and/or object(s) may be partially occluded from view.

The claimed system can use integral imaging for object recognition in a 3D scene which can perform efficiently in degraded environments because of the large number of apertures used to capture scene information which can mitigate the effects of degradations and obscurations of the scene. In this regard, object recognition under low light conditions is possible using the 3D reconstructed scene. Regions of interest of the 3D reconstructed scene can be found and inputted into a convolutional neural networks (CNN) (implemented by the deep learning engine). This CNN can be pre-trained specifically for low-light facial recognition by training the CNN using 3D reconstructed images after de-noising from elemental images obtained under low-light conditions having different SNRs. As the CNN has detected and/or seen objects obtained under various illumination conditions, it is possible to quickly perform object recognition.

The claimed system can use 3D integral imaging to classify objects in a scene under low illumination conditions using passive imaging sensors that operate in the visible spectrum. The disclosed passive imaging sensors may operate in other spectra across the electromagnetic spectrum, i.e., beyond the visible spectra. For example, in addition to operating in the visible spectrum, the disclosed passive imaging sensors may operate in spectra that include infrared, ultraviolet, x-ray wavelengths, or some combination thereof. The disclosed passive imaging sensors may also be effective for hyperspectral imaging. The 2D elemental images are read-noise dominant Upon 3D InIm reconstruction, signal-to-noise ratio increases resulting in improved image visualization. The 3D scene can be de-noised with total-variation regularization using an augmented Lagrange approach (TV-denoising). Regions of interest can be obtained to detect faces in the 3D scene using the Viola-Jones object detection framework which are then inputted into a trained CNN for facial/object recognition. The CNN can be trained specifically for low-light facial/object recognition by training the CNN using 3D reconstructed images after TV-denoising from elemental images obtained under low-light conditions having different SNRs.

FIG. 1 is a block diagram of the 3D scene 108 capture and reconstruction in accordance with an exemplary embodiment. In one embodiment, 3D integral imaging (InIm) can be used to capture a 3D scene 108. It can be appreciated that the 3D scene 108 can include humans and other physical objects. The 3D scene 108 can be a still or moving scene. Integral imaging uses many apertures such as an M×N array of image capturing devices 102 to capture the 3D scene 108 and create 3D reconstructions of the 3D scene where M and N denote the number of cameras in the x- and y-directions, respectively. Capturing the 3D scene 108 can be implemented in a 3D InIm pickup stage 100. The 3D InIm pickup stage 100 can include image capturing devices 100 such as a lenslett array, an array of cameras, or a moving camera to capture multiple 2D images of different perspectives of the 3D scene 108, known or elemental images. Each lens or lenslet 104 can contain a unique projective transformation that maps the 3D scene 108 onto the elemental images and is a function of the lens or lenslet 104 position and the focal length. For example, the lens or lenslet 104 can capture the 3D scene 108 at different angles and positions as shown by the projected rays 109. As a result, an array of inverted real images is formed on an image sensor 106 of the image capturing devices 102. The 3D InIm pickup stage 100 captures both intensity and angular information during the integral imaging.

Once the elemental images have been acquired, the 3D scene 108 can be reconstructed. During the 3D InIm reconstruction phase 110, the 3D scene 108 can be reconstructed by back-propagating (or back-projecting) the captured light rays 111 through a virtual pinhole 114 of a virtual pinhole array 112 to a particular depth plane a distance z away. As an example, the 3D InIm reconstruction phase 110 can include a depth plane 118 at depth 1 and a depth plane 119 at depth 2.

The 3D InIm reconstruction phase 110 can use a computer synthesized virtual pinhole array 112 for inverse mapping of each elemental image into the object space. The virtual pinhole array 112 can include virtual pinholes 114. Each of the elemental images are computationally overlapped afterward. The intensity distribution can be reconstructed at arbitrary planes inside the 3D object volume (of the 3D objects in the 3D scene 108). The 3D scene 108 includes depth information that can be recovered by post-processing the elemental images. Each elemental image is back-projected through its own viewpoint on the particular depth plane (e.g., depth plane 118 or depth plane 119). The chief ray, $R_i$ in 120 from the object surface in 3D space $(x, y, z)$ at location $(x_0, y_0, z_0)$ with azimuth angle $\theta$ and zenith angle $\phi i$ can be imaged by the i-th lens located at $(x_1, y_1, z_1)$ and arriving at the sensor plane at $(\tau, \psi)$.

In one embodiment, using the elemental images, the 3D InIm reconstruction phase 110 can be performed optically or computationally. Computational 3D InIm reconstruction is implemented as follows:

$$I(x, y; z) = \frac{1}{O(x, y)} \sum_{k=0}^{K-1} \sum_{B=0}^{B-1} E^{k,b}\left(x - k\frac{L_x \times p_x}{c_x \times M}, y - b\frac{L_y \times p_y}{c_y \times M}\right), \quad (1)$$

where $(x, y)$ is pixel index, z is reconstruction distance, $O(x, y)$ is the overlapping number on $(x, y)$, K and B are the total number of elemental images obtained in each column and row, respectively; $E^{k,b}$ is the elemental image in the kth column and bth row, $L_x$ and $L_y$ are the total number of pixels in each column and row, respectively, for each $E_{k,b}$, M is the magnification factor and equals z/g, g is the focal length, $p_x$ and $p_y$ is the pitch between image sensors, $c_x$ and $c_y$ are the size of the image sensor 106.

A captured image can be defined as $E(x, y)=I(x, y)r(x, y)$ where $I(x, y)>0$ is the illumination factor and $r(x, y)$ is the reflection coefficient between 0 and 1. As the illumination for the 3D scene 108 decreases, the reflection coefficient diminishes. Moreover, read-noise becomes greater for the 3D scene 108 than the 3D scene 108 signal hindering adequate scene visualization. Accordingly, the captured image becomes read-noise dominant. Read-noise results from on-chip sensor noise, is additive, and can be modeled as a zero-mean Gaussian distribution. Using Equation 1, the 3D InIm reconstruction of the 3D scene with read-noise is:

$$I(x, y; z) = \frac{1}{O(x, y)} \sum_{k=0}^{K-1} \sum_{b=0}^{B-1} (E^{k,b}(x', y') + \varepsilon_r^{k,b}(x', y')), \quad (2)$$

$$= \frac{1}{O(x, y)} \sum_{k=0}^{K-1} \sum_{b=0}^{B-1} E^{k,b}(x', y') + \frac{1}{O(x, y)} \sum_{k=0}^{K-1} \sum_{b=0}^{B-1} \varepsilon_r^{k,b}(x', y'),$$

where $\varepsilon_r^{k,b}(x', y')$ is zero mean additive Gaussian noise (i.e. read noise) for the elemental image in the kth column and bth row at location $(x', y')$, $x'=x-k(L_x \times p_x)/(c_x \times M)$ and $y'=y-k(L_y \times p_y)/(c_y \times M)$.

Taking the variance of Equation 2, the variance of the noise component for a fixed z, assuming that noise is wide sense stationary, is:

$$\text{var}\left(\frac{1}{O(x, y)} \sum_{k=0}^{K-1} \sum_{b=0}^{B-1} \varepsilon_r^{k,b}(x', y')\right) = \frac{1}{O(x, y)} \sigma^2, \quad (3)$$

where var(.) is variance and $\sigma^2$ is the variance of the read-noise.

As the number of overlapping images increases, the variance or noise power, of the read noise decreases. 3D InIm reconstruction is naturally optimal in the maximum-likelihood sense for read-noise limited images as the distribution is approximately Gaussian. Without photon counting devices to measure the flux density, the SNR of the image is estimated as:

$$\text{SNR}=\sqrt{(\langle g_o^2 \rangle - \langle N^2 \rangle)/\langle N^2 \rangle}, \quad (4)$$

where $g_o$ is the average power of the object region in the elemental image, $\langle N^2 \rangle$ is average noise power defined as $\langle N^2 \rangle = (\Phi_o+\Phi_b)Q_e t+Dt+n_r^2$, where $\Phi_o$ and $\Phi_b$ are the photon flux of the object and background (photons/pixel/second), D is dark current (electrons/pixel/second), $Q_e$ is the quantum efficiency (electrons/photons), t is exposure time (seconds), $n_r$ is read noise (RMS electrons/pixel/second), and $\langle \rangle$ denotes mean ensemble, respectively.

The number of photons per pixel ($N_{photons}$) can be estimated as:

$$\Phi_o t = N_{photons} \approx \text{SNR} \times n_r / Q_e \quad (5)$$

where $N_{photons}$ is the estimated number of photons.

Figure 2:
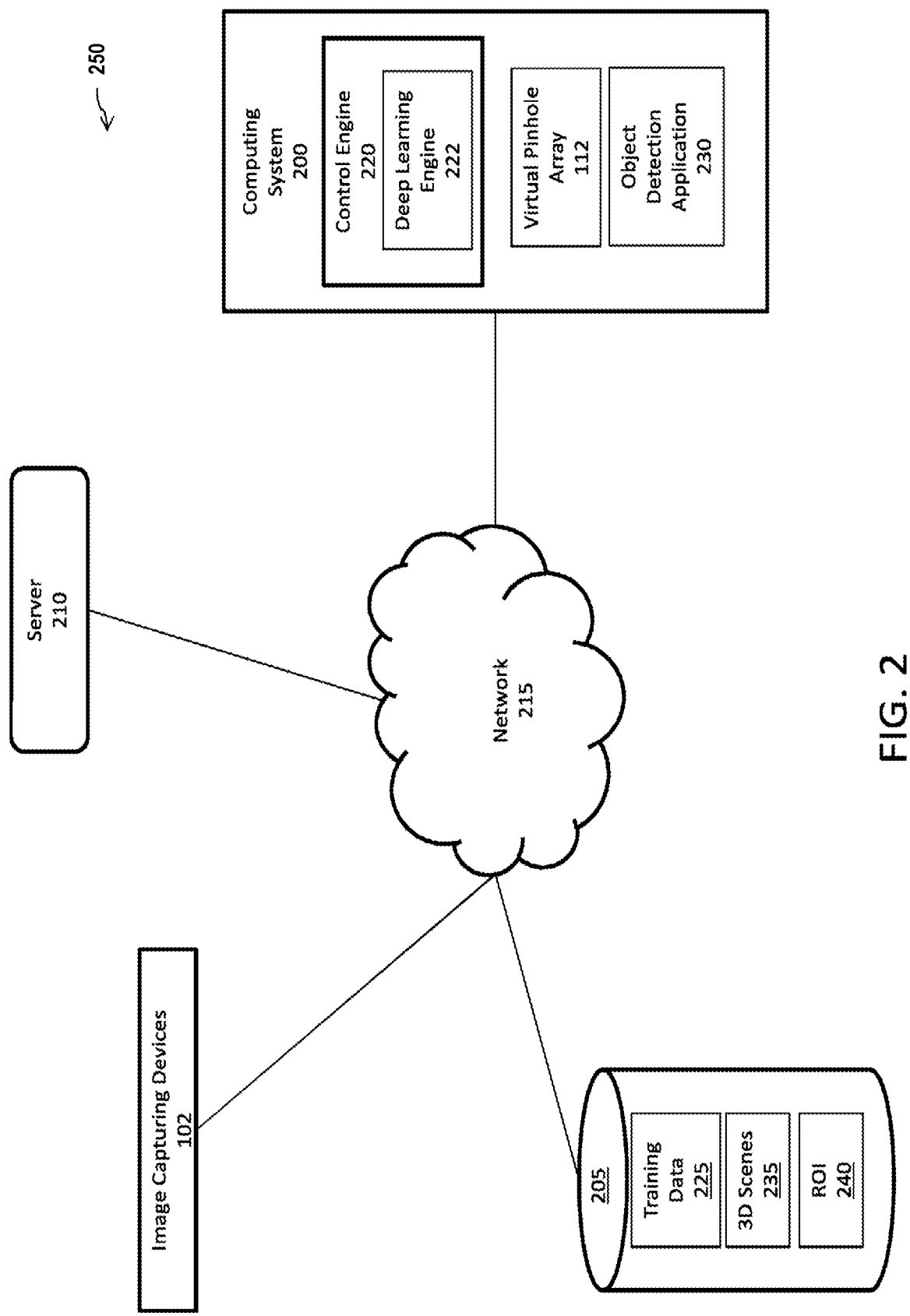
FIG. 2 illustrates 3D reconstructed images for training a CNN in accordance with an exemplary embodiment.

FIG. 2 is a block diagram illustrating the object recognition system 250 according to an exemplary embodiment. The object recognition system 250 can include one or more databases 205, one or more servers 210, one or more computing systems 200, and one or more image capturing devices 102. The computing system 200 can be in communication with the databases 205, the server(s) 210, and the image capturing devices 102, via a communications network 215. In one embodiment, the image capturing devices 102 can be directly connected to the computing system 200. The computing system 200 can implement at least one instance of a control engine 220. The routing engine can be an executable application configured to implement the object recognition system 250. The control engine 220 can also execute a deep learning engine 222. The deep learning engine 222 can implement deep learning algorithms (i.e., a deep learning model) to implement the object recognition system 250. The computing system 200 can further execute a virtual pinhole array 112, and an object detection application 230. The object detection application can be configured to detect regions of interest including objects in a 3D scene. The objects can include physical objects such as human body parts. As an example, the object detection application can detect regions of interest with human faces. The region(s) of interest and/or the object(s) may be partially occluded from view.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 200 includes one or more processors configured to communicate with the databases 205 and image capturing devices 102 via the network 215. The server 210 hosts one or more applications configured to interact with one or more components of the object recognition system 250. The databases 205 may store information/data, as described herein. For example, the databases 205 can include a training data database 225, a 3D scenes database 235, and a regions of interest (ROI) database 240. The training data database 225 can store information associated with training data for training deep learning algorithms such as CNN. The 3D scene database 235 can store data associated with 3D scenes. The ROI database 240 can store data associated with regions of interest in a 3D scene. The databases 205 and server 210 can be located at one or more geographically distributed locations from each other or from the computing system 200. Alternatively, the databases 205 can be included within server 210 or computing system 200.

In one embodiment, the one or more image capturing devices 102 can capture a 3D scene by capturing a plurality of elemental images capturing different perspectives of the 3D scene, using 3D InIm. As a non-limiting example, a 3D scene can be reconstructed using at least two elemental images. The 3D scene can be captured in an illumination level lower than a threshold amount. The low illumination levels can have low light flux. In one embodiment, the elemental images can be 2D. The one or more image capturing devices 102 can be one or more of a lenslett array, an array of cameras, and a moving camera. The 3D scene can include one or more objects. The objects can include human faces. The one or more image capturing devices 102 can transmit the captured elemental images to the computing system 300.

The computing system 300 can execute the control engine 220 in response to receiving the elemental images of the 3D scene. The control engine 220 can implement the virtual pinhole array 112 to reconstruct the 3D scene using the elemental images, using 3D InIm. As described above, the 3D scene can be reconstructed by back-propagating (or back-projecting) the captured light rays of the elemental images through a virtual pinhole of a virtual pinhole array 112 to a particular depth plane a specified distance away. In one embodiment, the control engine 220 can store the reconstructed 3D scene in the 3D scene database 235. It can be appreciated, the 3D scene can be reconstructed optically and computationally.

The reconstructed 3D scene can have an increased SNR resulting in improved image visualization. The control engine 220 can de-noise the reconstructed 3D scene using total-variation regularization using an augmented Lagrange approach (TV-denoising). As an example, the reconstructed 3D scene can have high Gaussian noise. Gaussian noise can be caused by camera sensor due to the low illumination conditions. The augmented Lagrange approach can be used for image restoration and to solve space-time TV minimization problems of motion blur and noise. By using the total-variation regularization using an augmented Lagrange approach on the reconstructed 3D scenes, the control engine 220 can reduce and/or eliminate the blur and noise in the reconstructed 3D scene.

Once the reconstructed 3D scene has been de-noised, the control engine 220 can input the image in the object detection application 230 to identify regions of interest. The object detection application 230 can implement a Viola-Jones face detector. The Viola-Jones face detector uses a face detection style algorithm which combines motion and image intensity information to detect regions of interest such as human faces in an image (or moving image). The Viola-Jones face detector uses rectangle filters to detect regions of interest such as human faces in the image (or moving image). In response to the object detection application 230 detecting the regions of interest, the control engine 220 can input the regions of interest in the deep learning engine 222 to identify and classify the objects such as human faces. In one embodiment, the control engine 220 can store the regions of interest in the ROI database 240. As described above, it can be appreciated that the object detection application can be configured to detect regions of interest including objects. The objects can be any particular physical objects including human faces.

The deep learning engine 222 can implement a trained CNN. CNN is a type of deep learning architecture which can be used for analyzing imagery. CNN can be trained on low illumination data for object/face recognition from the regions of interest. Feature extraction when implementing CNN is not needed at the expense of computational complexity. The CNN can be trained using training data. For example, the control engine 220 can retrieve training data from the training data database 225. The training data can be training images were 3D InIm reconstructed images of faces/objects after TV-denoising obtained under different illumination conditions. Training in photon-starved environments can improve the classifier's (i.e., CNN's) ability to discern between different faces/objects in low illumination conditions.

As non-limiting example, training data can be generated by the image capturing devices 102 capturing elemental images of a 3D scene at varying illumination levels. The image capturing devices 102 can transmit the images to the computing system. The control engine 220 can reconstruct the 3D scene using the virtual pinhole array (as described above). The control engine 220 can de-noise the reconstructed 3D scene using TV-denoising. The reconstructed and de-noised 3D scene can be embodied as training data and can be used to train the CNN. The control engine 220 can store the training data in the training data database 225

Figure 3:
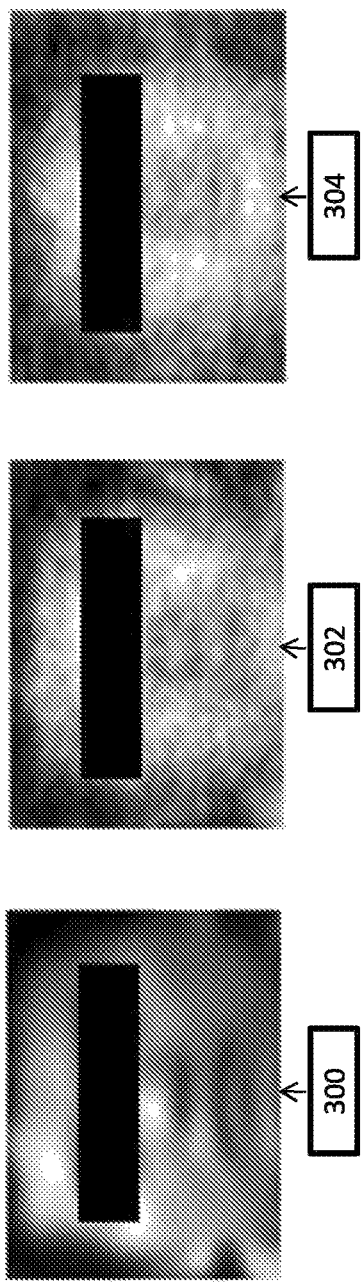
FIG. 3 is a block diagram illustrating an object recognition system according to an exemplary embodiment.

As a non-limiting example, normalized correlation used to demonstrate the difficulty in discriminating faces under low illumination conditions. With reference to FIG. 3, image 300, 302, and 304 are images of people in low illumination conditions. Image 300 shows a 3D reconstruction reference image at z=4.5 m after TV-denoising obtained using elemental images under an SNR of 10.41 dB. The image 300 can be correlated with 3D reconstructed images after TV-denoising whose elemental images were obtained under an SNR of −12.75 dB, shown in image 302 (true class object) and 304 (false class object), with correlation values of 0.58 and 0.48, respectively. Accordingly, it is difficult to discriminate objects under low-light conditions without training the classifier information about what object appears in low-light. Image 300 can correlate well with both image 302 and image 304 even though the person in image 304 is a different than the person in image 300 and image 302.

With reference to FIG. 2, in response to inputting the regions of interest into the deep learning engine 222, the deep learning engine 222 can identify and classify faces/objects from the regions of interest. As a non-limiting example, the deep learning engine 222 can execute face recognition from the regions of interest. It can be appreciated the deep learning engine 222 can implement other deep learning or machine learning architectures.

As a non-limiting example, the image capturing devices 102 can be embodied as Allied Vision Mako-192 camera with 86.4 mm×44 mm×29 mm camera dimensions, in the object recognition system 250. Additionally, the sensor (image sensor 106 of the image capturing devices 102 as shown in FIG. 1) can be embodied as an e2v EV 76C570 and a CMOS sensor type. The F/# is F/1.8 can be a focal length of 50 mm, pixel size of 4.5 um×4.5 um, sensor size of 7.2 mm (H)×5.4 mm (V), and image size of 1600 (H)×1200 (V). The camera read-noise can be 20.47 electrons/pixel/sec and the quantum efficiency at 525 nm can be 0.44 electron/photons. A gain of 0 can be used. The 3D InIm setup in this non-limiting example, includes 72 elemental images using 3×24 array with 10 mm (H)×80 mm (V) a pitch and exposure time of 0.015 s.

In this non-limiting example, the conditions for capturing the 3D include low illumination conditions and include a 3D InIm setup with 6 subjects (i.e., objects/faces) located a distance 4.5 m away from the camera array (i.e., image capturing devices 102). Of note, the disclosed systems and methods are operable regardless of the distance of the object(s) from the image capturing device(s). Thus, the object(s) in a scene may be located an arbitrary distance within the field of view (FOV) of the imaging capturing device(s) according to the disclosed systems and methods, i.e., the disclosed systems/methods are not dependent on the object(s) being a predetermined distance from the imaging capturing device(s) for the disclosed system/method to be efficacious.

Figure 4:
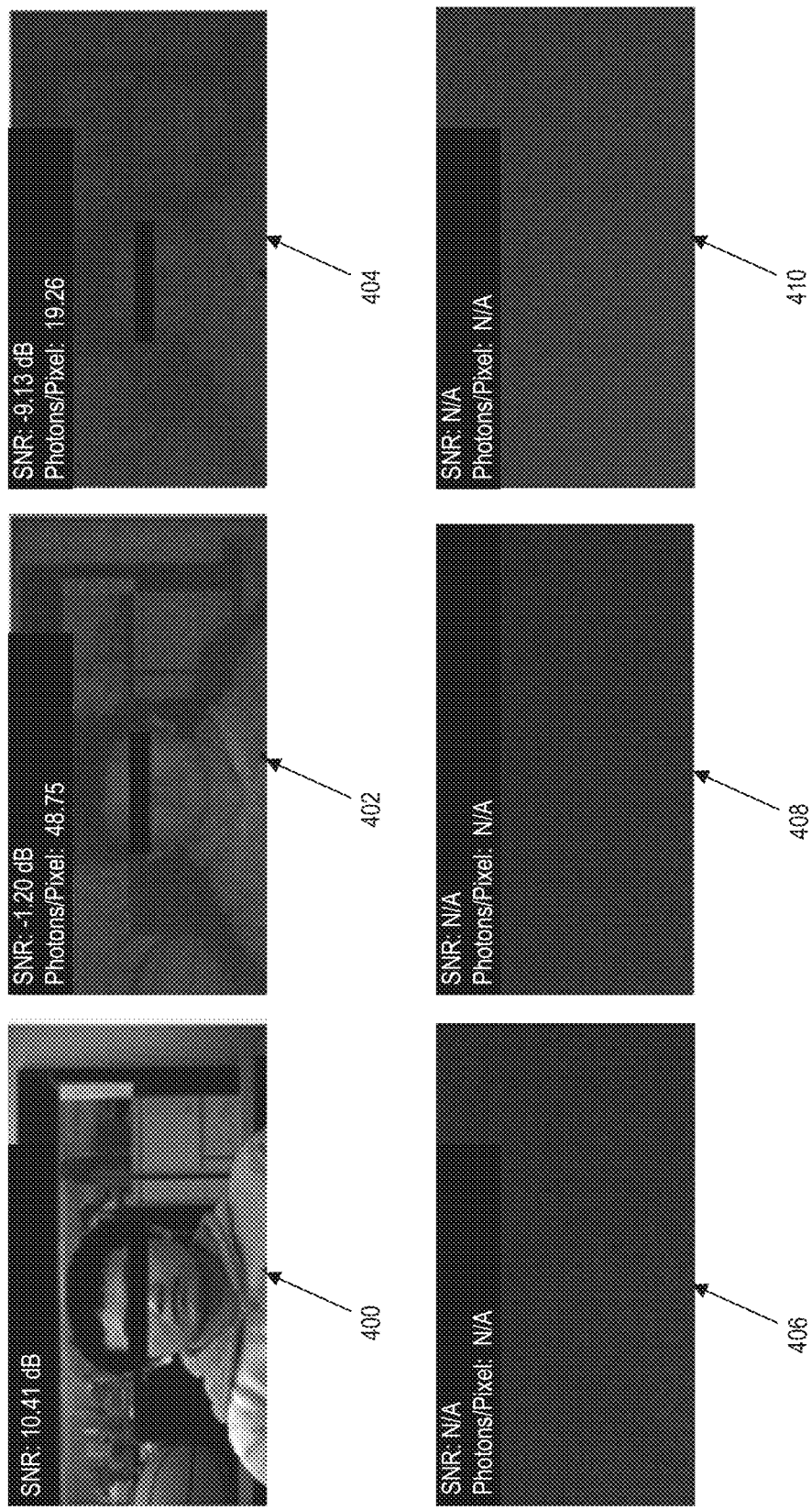
FIG. 4 illustrates sample elemental images with corresponding SNR and photon/pixel in accordance with an exemplary embodiment.
Figure 5:
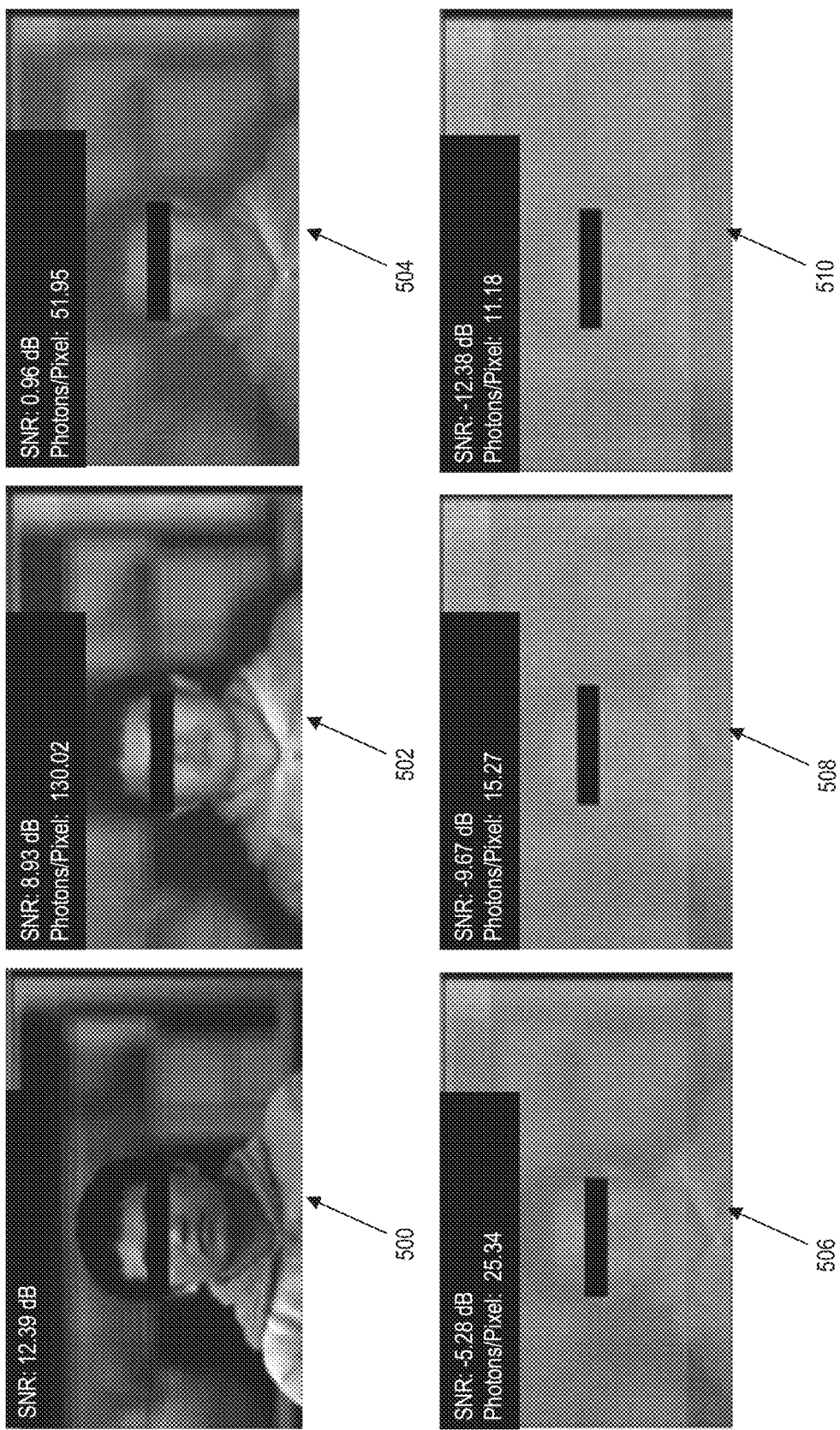
FIG. 5 illustrates three-dimensional (3D) reconstructed images in accordance with an exemplary embodiment.

Each subject can be captured under different illumination conditions resulting in different SNR levels. The illumination conditions can be altered by adjusting the intensity of a light source. With reference to FIGS. 4 and 5, image 400 in FIG. 4 depicts the elemental image with an SNR of 10.41 dB (i.e. good illumination) and image 500 in FIG. 5 shows the 3D reconstructed image (of the image 400 in FIG. 4) at z=4.5 m with an SNR of 12.39 dB.

Prior to 3D reconstruction, the elemental images can be registered and aligned due to the conditions (e.g., unbalanced camera array). Fifty bias frames can be taken and averaged for each camera in the camera array and subtracted from the elemental images. The SNR can be computed by assuming $\langle g_o^2 \rangle$ is the object (i.e., the person's face) while $\langle N^2 \rangle$ is an area of scene that is completely dark. The elemental images acquired using the 3D InIm under low illumination conditions are shown in FIG. 4 images 402-410. In FIG. 4 image 402, the SNR can be 1.20 dB with approximately 48.75 photons/pixel on the object. The person captured is still visible. In FIG. 4 image 404, the SNR decreases to −9.13 dB with 19.26 photons/pixel. The average power of object is lower than the noise power for the images shown in FIG. 2 (d)-(f). As a result, SNR cannot be computed as $\langle N_2 \rangle > \langle g_o^2 \rangle$ resulting in an imaginary number in Equation 4.

With reference to FIG. 5, 3D reconstructed images corresponding to the elemental images shown in FIG. 4 images 400-410, at z=4.5 m are shown. In FIG. 5 images 502-510, the SNR increases to 8.93 dB, 0.96 dB, −5.28 dB, −9.67 dB, and −12.38 dB, respectively. Moreover, the corresponding photons/pixel for FIG. 5 images 502-510 can be 130.02, 51.95 photons/pixel, 25.34 photons/pixel, 15.27 photons/pixel, and 11.18 photons/pixel, respectively.

Figure 6:
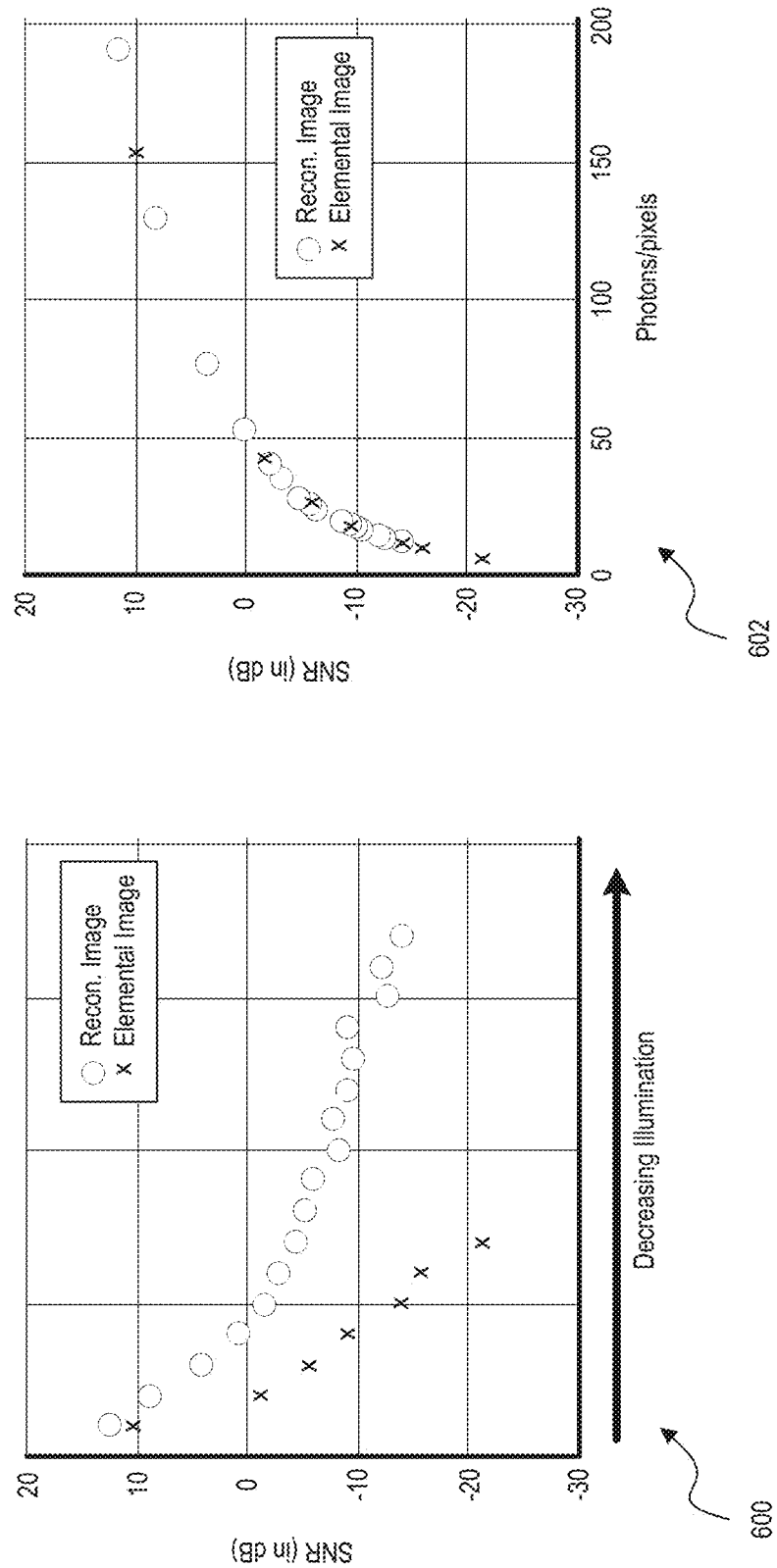
FIG. 6 illustrates graphs of SNR as illumination decreases and SNR as photons/pixels increase in accordance with an exemplary embodiment.

With reference to FIG. 6 depicts a first graph 600 of SNR as a function of decreasing illumination and a second graph 602 displaying SNR (in dB) as a function of the number of photons/pixel. In the first graph 600, the SNR of the 3D reconstructed images is higher than that of the 2D elemental images. The SNR may not be computed for elemental images with SNRs below −21.35 dB as the noise can be greater than the signal. With reference to the second graph 602, the 3D reconstructed images have a higher number of photons/pixel relative to their corresponding 2D elemental image.

Continuing with the non-limiting example, a CNN implemented by the deep learning engine 222, can be trained to perform facial recognition using data from the 3D InIm reconstructed data. A data set (i.e., training data set retrieved from the training data database 225) can include 6 different subjects, and 17 different illumination conditions acquired using the 3D InIm. The images can be then computationally reconstructed over distances of 4 m to 5 meters with a step size of 50 mm where the true object distance can be 4.5 meter. The dataset can be split into testing and training whereas 4 randomly chosen illumination conditions having SNRs of approximately −1.41 dB, −8.322 dB, −8.971 dB, and −12.75 dB may not be used to train the classifier and the other 13 illumination conditions were used for training. The training images can be grayscale images of size 256×256 pixels and can be perturbed by adding additive Gaussian noise with mean 0 and standard deviation of 0.01, 0.05 and 0.1, rotated −1, −0.5, 0.5 and 1 degrees, and translated −5, −3, 3, and 5 pixels in both the x- and y-directions generating a total of 29,232 images. The data can be then de-noised using total-variation regularization using an augmented Lagrange approach with a regularization parameter of 20000 (as shown in FIG. 3 302). The CNN can include a convolution layer [13×13, 20 filters], rectified linear unit layer (ReLU), 2×2 max pooling, convolution layer [11×11, 20 filters], ReLU, 2×2 max pooling, fully connected layer, and a SoftMax layer [6 outputs]. For training, stochastic gradient descent can be used with a learning rate of 0.0001 and a maximum of 10 epoch used along with the cross-entropy metric to evaluate model performance. In total, the model can take approximately 4 hours to train on a high performance computer utilizing a GPU Tesla K40m running CUDA 8.0 and implemented using MATLAB.

For classification, regions of interest of the 3D reconstructed image including of information from 72 elemental images can be considered to reduce the size of the input image. The 3D reconstructed image can be de-noised using total-variation regularization using an augmented Lagrange approach (i.e., TV-denoising) with a regularization parameter of 20000. The object detection application 230 implementing the Viola-Jones face detector can be used to find regions of interest. The regions of interest can be input into the pre-trained CNN classifier. This process can be repeated over all z. In the event, the same face appears in the same region and detected over multiple depths, the face with the highest mean value can be assumed to be the correct reconstruction depth as. The correct reconstruction depth is assumed to be signal plus noise whereas incorrect depths can be considered noise.

Table 1. summarizes the results of classifying the regions of interest using CNN.

TABLE 1

Face detection results using CNN under low illumination conditions using 3D reconstructed images

| | | Predicted | | | | | |
|---|---|---|---|---|---|---|---|
| | | Class 1 | Class 2 | Class 3 | Class 4 | Class 5 | Class 6 |
| Actual | Class 1 | 4 | 0 | 0 | 0 | 0 | 0 |
| | Class 2 | 0 | 4 | 0 | 0 | 0 | 0 |
| | Class 3 | 0 | 0 | 4 | 0 | 0 | 0 |
| | Class 4 | 0 | 0 | 0 | 4 | 0 | 0 |
| | Class 5 | 0 | 0 | 0 | 0 | 4 | 0 |
| | Class 6 | 0 | 0 | 0 | 0 | 0 | 4 |

Figure 7:
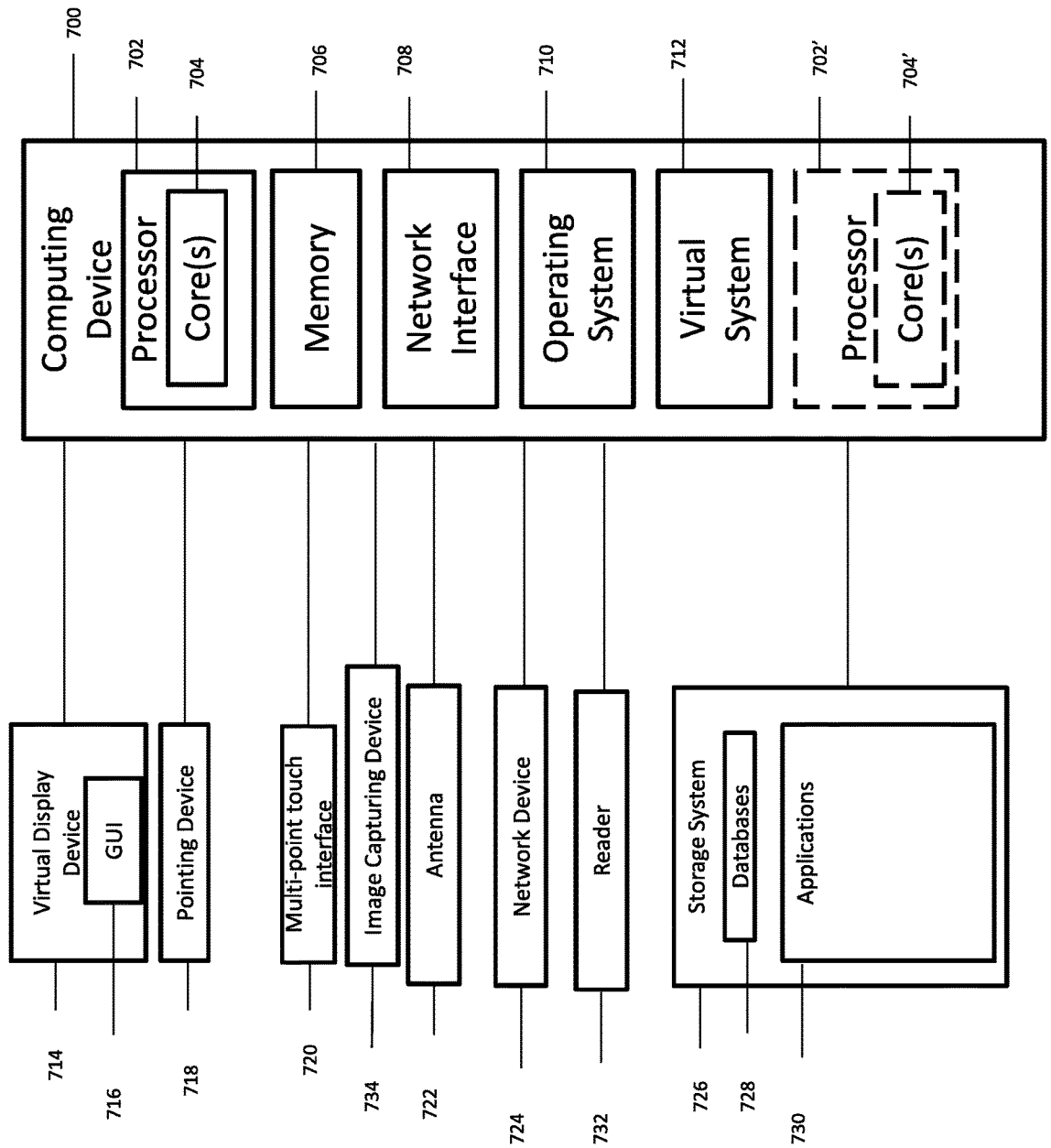
FIG. 7 illustrates a block diagram of an example computing device for implementing exemplary embodiments of the present disclosure.

FIG. 7 is a block diagram of an exemplary computing device suitable for use in an embodiment. The computing device 700 may be, but is not limited to, a smartphone, laptop, tablet, desktop computer, server or network appliance. The computing device 700 can be embodied as part of the computing system. The computing device 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 706 included in the computing device 700 may store computer-readable and computer-executable instructions or software (e.g., applications 730 such as the control engine 220, deep learning engine 222, virtual pinhole array 112, and object detection application 230) for implementing exemplary operations of the computing device 700. The computing device 700 also includes configurable and/or programmable processor 702 and associated core(s) 704, and optionally, one or more additional configurable and/or programmable processor(s) 702' and associated core(s) 704' (for example, in the case of computer systems having multiple processors/cores), for executing computer-readable and computer-executable instructions or software stored in the memory 706 and other programs for implementing exemplary embodiments of the present disclosure. Processor 702 and processor(s) 702' may each be a single core processor or multiple core (704 and 704') processor. Either or both of processor 702 and processor(s) 702' may be configured to execute one or more of the instructions described in connection with computing device 700.

Virtualization may be employed in the computing device 700 so that infrastructure and resources in the computing device 700 may be shared dynamically. A virtual machine 712 may be provided to handle a process running on multiple processors so that the process appears to be using only one computing resource rather than multiple computing resources. Multiple virtual machines may also be used with one processor.

Memory 706 may include a computer system memory or random access memory, such as DRAM, SRAM, EDO RAM, and the like. Memory 706 may include other types of memory as well, or combinations thereof.

A user may interact with the computing device 700 through a visual display device 714, such as a computer monitor, which may display one or more graphical user interfaces 716, multi touch interface 720, a pointing device 718, an image capturing device 734 and a reader 732.

The computing device 700 may also include one or more computer storage devices 726, such as a hard-drive, CD-ROM, or other computer readable media, for storing data and computer-readable instructions and/or software that implement exemplary embodiments of the present disclosure (e.g., applications). For example, exemplary storage device 726 can include one or more databases 728 for storing information regarding training data, 3D scenes, and objects. The databases 728 may be updated manually or automatically at any suitable time to add, delete, and/or update one or more data items in the databases.

The computing device 700 can include a network interface 708 configured to interface via one or more network devices 724 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 722 to facilitate wireless communication (e.g., via the network interface) between the computing device 700 and a network and/or between the computing device 700 and other computing devices. The network interface 708 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

The computing device 700 may run any operating system 710, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 700 and performing the operations described herein. In exemplary embodiments, the operating system 710 may be run in native mode or emulated mode. In an exemplary embodiment, the operating system 710 may be run on one or more cloud machine instances.

Figure 8:
FIG. 8 illustrates an exemplary process of the object recognition system in accordance with an exemplary embodiment.

FIG. 8 is a flowchart illustrating an exemplary process of the object detection system in accordance with an exemplary embodiment. In operation 800, one or more image capturing devices (e.g., image capturing devices 102 as shown in FIGS. 1-2) can capture a plurality of elemental images of a 3D scene (e.g., 3D scene 108 as shown in FIG. 1) including one or more objects. The 3D scene can be captured in an illumination level than a threshold amount. In operation 802, the one or more image capturing devices can transmit the elemental images to a computing system. The computing system can include a database host a deep learning engine (e.g., deep learning engine 222 as shown in FIG. 2) and an object detection application 230 (e.g., object detection application 230 as shown in FIG. 2). In operation 804, the computing system can receive the plurality of elemental images of the 3D scene. The illumination conditions associated with the elemental images received by the computing system are unknown, i.e., illumination conditions are not transmitted to the computing system for use in downstream processing operations by the computing system. In operation 806, the computing system can reconstruct the 3D scene using the plurality of elemental images of the 3D scene. In operation 808, the computing system can de-noise the reconstructed 3D scene. In operation 810, the computing system can input the 3D scene in an object detection application to identify one or more regions of interest in the 3D scene. In operation 812, the computing system can retrieve a set of training data from the database (e.g., training data database 225 as shown in FIG. 2). In operation 814, the computing system can train the deep learning engine using the training data on at least one instance. Accordingly, once the deep learning engine is trained, it generally need not be retrained for future implementations of the disclosed system/method. In operation 816, the computing system can input the one or more identified regions of interest in the deep learning engine. In operation 818, the computing system, via the deep learning engine, can identify the one or more objects in the one or more regions of interest.

Figure 9:
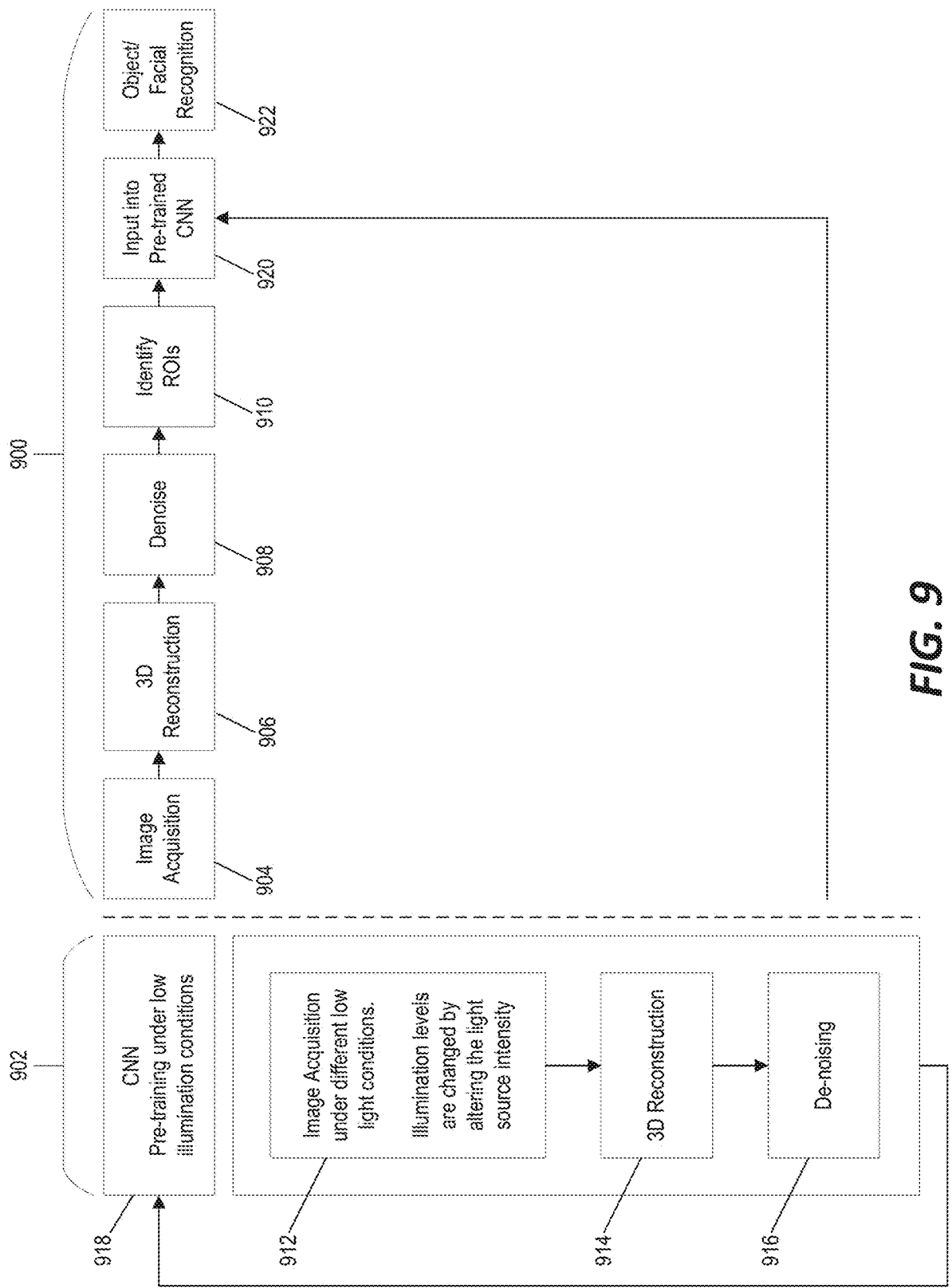
FIG. 9 illustrates an exemplary process of the object recognition system in accordance with an exemplary embodiment.

FIG. 9 is a flowchart illustrating an exemplary process of the object detection system in accordance with an exemplary embodiment. The object detection system can be implemented by executing process 900 and process 902. In process 900 and in operation 904, one or more image capturing devices (e.g., image capturing devices 102 as shown in FIGS. 1 and 2) can capture elemental images of a 3D scene (e.g., 3D scene 108 as shown in FIG. 1) in various perspectives and transmit the elemental images to a computing system (e.g., computing system 200 as shown in FIG. 2). The computing system can host virtual pinhole array (e.g., virtual pinhole array 112), a deep learning engine (e.g., deep learning engine 222 as shown in FIG. 2), and an object detection application (e.g., object detection application 230 as shown in FIG. 2). In operation 906, the computing system can reconstruct the 3D scene using the elemental images by back-propagating captured light rays from the plurality of elemental images through virtual pinholes of a virtual pinhole array to a specified depth plane at a specified distance. In operation 908, the computing system can de-noise the reconstructed 3D scene. In operation 910, the computing system can identify regions of interest in the reconstructed and de-noised 3D scene using the object detection application.

With reference to process 902, prior to operation 918 of process 902, the computing system can implement process 902 of training a CNN being implemented by the deep learning engine. In operation 912, image capturing devices can capture elemental images of a 3D scene at various illumination levels. In operation 914, the computing system can reconstruct the 3D scene using the elemental images captured in various illumination levels. In operation 916, the reconstructed 3D scene is de-noised and can be embodied as training data. In operation 918, the CNN is trained using the reconstructed and de-noised 3D scene.

Turning back to process 900, in operation 920, the identified regions of interest can be input in the trained CNN being implemented by the deep learning engine. In operation 922, the deep learning engine can identify and classify objects and/or human faces in the regions of interest.

All documents cited herein and the following listed document, all referenced publications cited therein, and the descriptions and information contained in these documents are expressly incorporated herein in their entirety to the same extent as if each document or cited publication was individually and expressly incorporated herein:

A. Markman and B. Javidi unpublished document entitled "Learning in the dark: 3D Integral Imaging object recognition in very low illumination conditions using Convolutional Neural Networks," [8 pages].

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

REFERENCES

1. N. Levin, Q. Zhang, "A global analysis of factors controlling VIIRS nighttime light levels from densely populated areas," Remote Sens. Res. 190, 366-382 (2017).
2. B. Phillips, D. Gruber, G. Vasan, C. Roman, V. Pieribone, and J. Sparks, "Observations of in situ deep-sea marine bioluminescence with a high-speed, high-resolution sCMOS camera," DEEP-SEA RES PT 1 111, 102-109 (2016).
3. D. Boening, T. Groemer, and J. Klingauf, "Applicability of an EM-CCD for spatially resolved TIR-ICS," Opt. Express 18(13), 13516-13528 (2010).
4. Z. Petrášek and K. Suhling, "Photon arrival timing with sub-camera exposure time resolution in wide-field time-resolved photon counting imaging," Opt. Express 18(24), 24888-24901 (2010).
5. G. Lippmann, "Épreuves réversibles donnant la sensation du relief," J. Phys. Theory Appl. 7(1), 821-825 (1908).
6. J. Jang and B. Javidi, "Three-dimensional synthetic aperture integral imaging," Opt. Lett. 27(13), 1144-1146 (2002).
7. A. Llavador, E. Sánchez-Ortiga, G. Saavedra, B. Javidi, and M. Martinez-Corral, "Free-depths reconstruction with synthetic impulse response in integral imaging," Opt. Exp. 23(23), 30127-30135 (2015).
8. F. Okano, H. Hoshino, J. Arai, and I. Yuyama, "Real-time pickup method for a 3D image based on integral photography," Appl. Opt. 36(7), 1598-1603 (1997).
9. H. Hoshino, F. Okano, H. Isono, and I. Yuyama, "Analysis of resolution limitation of integral photography," J. Opt. Soc. Am. A 15(8), 2059-2065 (1998).
10. M. Yamaguchi and R. Higashida, "3D touchable holographic light-field display," Appl. Opt. 55(3), A178-A183 (2016).
11. B. Tavakoli, B. Javidi, and E. Watson, "Three dimensional visualization by photon counting computational integral imaging," Opt. Express. 16(7), 4426-4436 (2008).
12. A. Stern, D. Doron and B. Javidi, "Experiments with three-dimensional integral imaging under low light levels," IEEE Photon. J. 4(4), 1188-1195 (2012).
13. A. Markman, X. Shen, and B. Javidi, "Three-dimensional object visualization and detection in low light illumination using integral imaging," Opt. Lett. 42(16), 3068-3017 (2017).
14. S. Chan, R Ramsin, K. Gibson, P. Gill, and T. Nguyen, "An augmented Lagrangian method for total variation video restoration," IEEE Trans. Image Process. 20(11), 3097-3111 (2011).
15. P. Viola, M. Jones, and D. Snow, "Detecting pedestrians using patterns of motion and appearance," CVPR 63(2), 153-161 (2005).
16. A. Krizhevsky, I. Sutskever, and G. Hinton, "Imagenet classification with deep convolutional neural networks," NIPS, 1097-1105 (2012).
17. S. Lawrence, C. Giles, A. Chung *Tsoi*, and A. D. Back, "Face recognition: A convolutional neural-network approach," IEEE Trans. Neural Netw. 8(1), 98-113 (1997).
18. R. Gonzalez and R. Woods, Digital Image Processing (Pearson, 2008).
19. F. Sadjadi and A. Mahalanobis, "Automatic Target Recognition," Proc. SPIE 10648 (2018).

The invention claimed is:

1. An object recognition system operable in a range of illumination conditions including in low illumination conditions using 3D integral imaging, the system comprising:
a computing system hosting a deep learning engine and an object detection application; and
a camera array in communication with the computing system, the camera array including a plurality of cameras each positioned to capture a field of view from a different perspective, the camera array configured to
capture a plurality of elemental images of a 3D scene in low illumination conditions having low light flux, wherein each elemental image of the plurality of elemental images is captured by a different camera of the camera array, the 3D scene including one or more objects, and
transmit the plurality of elemental images to the computing system;
wherein the computing system is configured to train the deep learning engine by
retrieving a set of training data, the set of training data including a plurality of sets of elemental images of an imaging subject, wherein each set of elemental images of the imaging subject is captured by the camera array under a different low illumination condition of a plurality of different low illumination conditions,
reconstructing a plurality of depth images from the plurality of sets of elemental images of the imaging subject, the plurality of depth images including a depth image at each of a plurality of different distances from the camera array for each of the plurality of different low illumination conditions, wherein reconstructing a depth image includes back-propagating image data from each elemental image of a set of elemental images as light rays through a virtual pinhole array to a depth plane corresponding to a defined distance from the camera array and defining the depth image as a sum of the back-propagated image data from all of the elemental images of the set of elemental images at the depth plane corresponding to the defined distance from the camera array, and
training the deep learning engine to produce as an output an identification of the imaging subject in response to receiving as an input one or more depth images from each set of elemental images corresponding to a position of the imaging subject relative to the camera array, wherein the one or more depth images from each set of elemental images corresponding to the position of the imaging subject relative to the camera array includes at least one selected from a group consisting of a single depth image and a subset of depth images corresponding to a sequence of adjacent distances from the camera array;
wherein the computing system is further configured to
classify a detected object in the plurality of elemental images of the 3D scene captured by the camera array by
receiving the plurality of elemental images of the 3D scene captured in the low illumination conditions;
reconstructing a plurality of depth images of the 3D scene using the plurality of elemental images of the 3D scene;
de-noising the plurality of depth images of the 3D scene;
applying the object detection application to the plurality of depth images of the 3D scene to identify one or more regions of interest in the one or more depth images of the plurality of depth images of the 3D scene;
providing image data for a region of interest in the one or more depth images of the plurality of depth images of the 3D scene as input to the trained deep learning engine; and
identifying, based on the output of the trained deep learning engine generated in response to receiving the image data for the region of interest as input, the one or more objects in the one or more regions of interest.

2. The system of claim 1, wherein the deep learning engine implements a Convolutional Neural Network (CNN).

3. The system of claim 1, wherein the set of training data further includes (i) multiple sets of elemental images for each of a plurality of different imaging subject captured in various low illumination levels and having various levels of low signal-to-noise ratio (SNR), and (ii) augmented data obtained by perturbing elemental images with Gaussian noise.

4. The system of claim 1, wherein the computing system is configured to de-noise the plurality of depth images of the 3D scene by total-variation regularization using an augmented Lagrange approach.

5. The system of claim 1, wherein the computing system is configured to reconstruct the plurality of depth images of the 3D scene using the plurality of elemental images of the 3D scene by back-propagating captured light rays from the plurality of elemental images through virtual pinholes of a virtual pinhole array to each of a plurality of specified depth planes.

6. The system of claim 1, wherein the camera array operates in multiple bands across the electromagnetic spectrum.

7. The system of claim 6, wherein the camera array operates in the visible spectrum and at least one additional spectrum selected from the group consisting of infrared, ultraviolet and x-ray, and combinations thereof.

8. The system of claim 1, wherein the computing system does not receive any input indicating the illumination conditions associated with the elemental images of the 3D scene.

9. The system of claim 1, wherein the computing system is configured to provide the image data for the region of interest in the one or more depth images of the plurality of depth images of the 3D scene as input to the trained deep learning engine by providing as input to the trained deep learning engine a new subset of depth images corresponding to a sequence of adjacent distances from the camera array including at least one depth image identified by the object detection application as including the object and a defined number of adjacent depth images.

10. An object recognition method operable in a range of illumination conditions including in low illumination conditions using 3D integral imaging, the method comprising:
capturing, via a camera array in communication with a computing system, a plurality of elemental images of a 3D scene in low illumination conditions having low light flux, the 3D scene including one or more objects, wherein the camera array includes a plurality of cameras each positioned to capture a field of view from a different perspective;
receiving, via the computing system, the plurality of elemental images of the 3D scene;
reconstructing, via the computing system, a plurality of depth images of the 3D scene using the plurality of elemental images of the 3D scene, wherein reconstructing the plurality of depth images of the 3D scene includes back-propagating captured light rays from each elemental image through a virtual pinhole array to each of a plurality of different depth planes;
de-noising, via the computing system, the plurality of depth images of the 3D scene;
applying, via the computing system, an object detection application to each depth image of the plurality of depth images of the 3D scene, wherein the object detection application is configured to identify regions of interest in the depth images of the 3D scene that contain an object of the one or more objects;
applying, via the computing system, a deep learning engine to each region of interest identified by the object detection application, wherein the deep learning engine is trained to receive as input image data from one or more depth images corresponding to a region of interest and to produce as output a classification of the object in the region of interest, wherein the deep learning engine is trained to classify the object based on a set of training data including a plurality of sets of depth images of the object reconstructed from a plurality of sets of elemental images of the object each captured under different low illumination conditions of a plurality of different low illumination conditions, and wherein the one or more depth images provided as input to the deep learning engine includes at least one selected from a group consisting of a single depth image identified by the object detection application as including a region of interest and a subset of depth images corresponding to a sequence of adjacent distances from the camera array;
identifying, based on the output of the deep learning engine, the object in the 3D scene; and
training the deep learning engine by
retrieving a set of training data from a database, the set of training data including a plurality of sets of elemental images of an imaging subject, wherein each set of elemental images of the imaging subject is captured by the camera array under a different low illumination condition of the plurality of different low illumination conditions,
reconstructing a plurality of depth images from the plurality of sets of elemental images of the imaging subject in the set of training data, the plurality of depth images including a depth image at each of a plurality of different distances from the camera array for each of the plurality of different low illumination conditions, wherein reconstructing a depth image includes back-propagating image data from each elemental image of a set of elemental images as light rays through a virtual pinhole array to a depth plane corresponding to a defined distance from the camera array and defining the depth image as a sum of the back-propagated image data from all of the elemental images of the set of elemental images at the depth plane corresponding to the defined distance from the camera array, and
training the deep learning engine to produce as an output an identification of the imaging subject in response to receiving as an input one or more depth images from each set of elemental images corresponding to a position of the imaging subject relative to the camera array, wherein the one or more depth images from each set of elemental images corresponding to the position of the imaging subject relative to the camera array includes at least one selected from a group consisting of a single depth image and a subset of depth images corresponding to a sequence of adjacent depths.

11. The method of claim 10, wherein the deep learning engine implements a Convolutional Neural Network (CNN), and wherein the deep learning engine is trained using training data that includes (i) a set of elemental images including elemental images captured in various low illumination levels and having various levels of low signal-to-noise ratio (SNR), and (ii) augmented data obtained by perturbing elemental images with Gaussian noise.

12. The method of claim 10, wherein de-noising the plurality of depth images of the 3D scene includes total-variation regularization using an augmented Lagrange approach.

13. The method of claim 10, wherein capturing the plurality of elemental images of the 3D scene including the one or more objects includes capturing the plurality of elemental images of the 3D scene including at least one human face.

14. The method of claim 13, wherein the object detection application is configured to identify the one or more regions of interest by identifying one or more regions of interest that include the at least one human face.

15. The method of claim 10, wherein capturing the plurality of elemental images of the 3D scene includes capturing a plurality of elemental images of the 3D scene where at least one of the one or more objects in the 3D scene is at least partially occluded from view in the plurality of elemental images.

16. The method of claim 10, wherein capturing a plurality of elemental images of the 3D scene includes capturing the plurality of elemental images of the 3D scene in which the one or more objects in the 3D scene may be located any distance from the camera array provided the distance is within the field of view of the camera array.

17. The method of claim 10, wherein applying the deep learning engine to each region of interest identified by the object detection application includes providing, as the input to the deep learning engine, a new subset of depth images corresponding to a sequence of adjacent distances from the camera array including at least one depth image identified by the object detection application as including the object and a defined number of adjacent depth images.

18. A non-transitory computer readable memory medium storing instructions, wherein the instructions are executable by a processor to:
   cause a camera array to capture a plurality of elemental images of a 3D scene including one or more objects and in an illumination level lower than a threshold amount, wherein the camera array includes a plurality of cameras each positioned to capture a field of view from a different perspective;
   receive the plurality of elemental images of the 3D scene;
   reconstruct a plurality of depth images of the 3D scene using the plurality of elemental images of the 3D scene, wherein reconstructing the plurality of depth images of the 3D scene includes back-propagating captured light rays from each elemental image through a virtual pinhole array to each of a plurality of different depth planes;
   de-noise, the plurality of depth images of the 3D scene;
   apply an object detection application to each depth image of the plurality of depth images of the 3D scene, wherein the object detection application is configured to identify regions of interest in the depth images of the 3D scene that contain an object of the one or more objects;
   apply a deep learning engine to each region of interest identified by the object detection application, wherein the deep learning engine is trained to receive as input image data from one or more depth images corresponding to a region of interest and to produce as output a classification of the object in the region of interest, wherein the deep learning engine is trained to classify the object based on a set of training data including a plurality of sets of depth images of the object reconstructed from a plurality of sets of elemental images of the object each captured under different low illumination conditions of a plurality of different low illumination conditions, and wherein the one or more depth images provided as input to the deep learning engine includes at least one selected from a group consisting of a single depth image identified by the object detection application as including a region of interest and a subset of depth images corresponding to a sequence of adjacent distances from the camera array;
   identify, based on the output of the deep learning engine, the object in the 3D scene;
   retrieve a set of training data from a database, the set of training data including a plurality of sets of elemental images of an imaging subject, wherein each set of elemental images of the imaging subject is captured by the camera array under a different low illumination condition of a plurality of different low illumination conditions;
   reconstruct a plurality of depth images from the plurality of sets of elemental images of the imaging subject in the set of training data, the plurality of depth images including a depth image at each of a plurality of different distances from the camera array for each of the plurality of different low illumination conditions, wherein reconstructing a depth image includes back-propagating image data from each elemental image of a set of elemental images as light rays through a virtual pinhole array to a depth plane corresponding to a defined distance from the camera array and defining the depth image as a sum of the back-propagated image data from all of the elemental images of the set of elemental images at the depth plane corresponding to the defined distance from the camera array; and
   train the deep learning engine to produce as an output an identification of the imaging subject in response to receiving as an input one or more depth images from each set of elemental images corresponding to a position of the imaging subject relative to the camera array, wherein the one or more depth images from each set of elemental images corresponding to the position of the imaging subject relative to the camera array includes at least one selected from a group consisting of a single depth image and a subset of depth images corresponding to a sequence of adjacent depths.

19. The non-transitory computer readable memory medium of claim 18, wherein the instructions, when executed by the processor, cause the processor to apply the deep learning engine to each region of interest identified by the object detection application by providing, as the input to the deep learning engine, a new subset of depth images corresponding to a sequence of adjacent distances from the camera array including at least one depth image identified by the object detection application as including the object and a defined number of adjacent depth images.

* * * * *